United States Patent
Duguay

(10) Patent No.: US 10,364,695 B2
(45) Date of Patent: Jul. 30, 2019

(54) RING SEAL FOR BLADE OUTER AIR SEAL GAS TURBINE ENGINE RAPID RESPONSE CLEARANCE CONTROL SYSTEM

(71) Applicant: United Technologies Corporation, Hartford, CT (US)

(72) Inventor: Brian Duguay, Berwick, ME (US)

(73) Assignee: United Technologies Corporation, Farmington, CT (US)

(*) Notice: Subject to any disclaimer, the term of this patent is extended or adjusted under 35 U.S.C. 154(b) by 69 days.

(21) Appl. No.: 14/780,854

(22) PCT Filed: Feb. 6, 2014

(86) PCT No.: PCT/US2014/015067
§ 371 (c)(1),
(2) Date: Sep. 28, 2015

(87) PCT Pub. No.: WO2014/189557
PCT Pub. Date: Nov. 27, 2014

(65) Prior Publication Data
US 2016/0053629 A1    Feb. 25, 2016

Related U.S. Application Data

(60) Provisional application No. 61/811,527, filed on Apr. 12, 2013.

(51) Int. Cl.
| | |
|---|---|
| *F01D 11/22* | (2006.01) |
| *F01D 25/24* | (2006.01) |
| *F04D 29/16* | (2006.01) |
| *F16J 15/00* | (2006.01) |
| *F16J 15/34* | (2006.01) |
| *F16J 15/44* | (2006.01) |

(52) U.S. Cl.
CPC .............. *F01D 11/22* (2013.01); *F01D 25/24* (2013.01); *F16J 15/002* (2013.01); *F16J 15/3452* (2013.01); *F16J 15/442* (2013.01); *F16J 15/445* (2013.01); *F04D 29/164* (2013.01); *F05D 2220/32* (2013.01); *F05D 2240/55* (2013.01)

(58) Field of Classification Search
CPC ...... F01D 11/002; F01D 11/005; F01D 11/08; F01D 11/14; F01D 11/20; F01D 11/22; F16J 15/002; F16J 15/02; F16J 15/025; F16J 15/028; F16J 15/444
USPC ......................................... 277/355, 644, 648
See application file for complete search history.

(56) References Cited

U.S. PATENT DOCUMENTS

| | | | |
|---|---|---|---|
| 3,664,675 A * | 5/1972 | Malmstrom ......... | F16J 15/3456 277/400 |
| 4,472,108 A * | 9/1984 | Pask ....................... | F01D 11/22 415/113 |
| 4,573,866 A | 3/1986 | Sandy, Jr. et al. | |
| 4,679,981 A | 7/1987 | Guibert et al. | |
| 7,562,880 B2 * | 7/2009 | Paprotna .............. | F16J 15/3288 277/644 |
| 8,016,297 B2 * | 9/2011 | Heinemann ........... | F01D 11/005 277/644 |
| 8,408,446 B1 * | 4/2013 | Smoke .................. | B23P 15/006 228/193 |

(Continued)

*Primary Examiner* — Ninh H. Nguyen
*Assistant Examiner* — Brian P Wolcott
(74) *Attorney, Agent, or Firm* — O'Shea Getz P.C.

(57) ABSTRACT

An active clearance control system for a gas turbine engine includes a ring seal engageable with a multiple of air seal segments.

12 Claims, 5 Drawing Sheets

(56) References Cited

U.S. PATENT DOCUMENTS

2009/0053055 A1    2/2009  Cornett et al.
2011/0318171 A1*  12/2011  Albers ................. F01D 11/125
                                                                415/173.1
2012/0304657 A1*  12/2012  Melton .................... F23R 3/60
                                                                   60/752

* cited by examiner

RING SEAL FOR BLADE OUTER AIR SEAL GAS TURBINE ENGINE RAPID RESPONSE CLEARANCE CONTROL SYSTEM

This application claims priority to PCT Patent Application No. PCT/US 14/15067 filed Feb. 6, 2014, which claims priority to U.S. Patent Appln. No. 61/811,527 filed Apr. 12, 2013.

STATEMENT REGARDING FEDERALLY SPONSORED RESEARCH OR DEVELOPMENT

This disclosure was made with Government support under FA-8650-09-D-2923 0021 awarded by The United States Air Force. The Government has certain rights in this disclosure.

BACKGROUND

The present disclosure relates to a gas turbine engine and, more particularly, to a blade tip rapid response active clearance control (RRACC) system therefor.

Gas turbine engines, such as those that power modern commercial and military aircraft, generally include a compressor to pressurize an airflow, a combustor to burn a hydrocarbon fuel in the presence of the pressurized air, and a turbine to extract energy from the resultant combustion gases. The compressor and turbine sections include rotatable blade and stationary vane arrays. Within an engine case structure, the radial outermost tips of each blade array are positioned in close proximity to a shroud assembly. Blade Outer Air Seals (BOAS) supported by the shroud assembly are located adjacent to the blade tips such that a radial tip clearance is defined therebetween.

When in operation, the thermal environment in the engine varies and may cause thermal expansion and contraction such that the radial tip clearance varies. The radial tip clearance is typically designed so that the blade tips do not rub against the BOAS under high power operations when the blade disk and blades expand as a result of thermal expansion and centrifugal loads. When engine power is reduced, the radial tip clearance increases. To facilitate engine performance, it is operationally advantageous to maintain a close radial tip clearance through the various engine operational conditions.

SUMMARY

An active clearance control system for a gas turbine engine according to one disclosed non-limiting embodiment of the present disclosure includes a ring seal engageable with a multiple of air seal segments.

A further embodiment of the present disclosure includes, wherein the ring seal includes a multiple of fingers.

A further embodiment of any of the foregoing embodiments of the present disclosure includes, wherein the ring seal includes a multiple of leaf springs.

A further embodiment of any of the foregoing embodiments of the present disclosure includes, further comprising an engine case static structure with a circumferential slot, the ring seal located within the circumferential slot.

A further embodiment of any of the foregoing embodiments of the present disclosure includes, wherein the ring seal engages an axial face of the multiple of air seal segments.

A further embodiment of any of the foregoing embodiments of the present disclosure includes, wherein the ring seal includes a multiple of fingers directed toward the circumferential slot.

A further embodiment of any of the foregoing embodiments of the present disclosure includes, wherein the ring seal engages an axial face of the multiple of air seal segments.

A further embodiment of any of the foregoing embodiments of the present disclosure includes, wherein the ring seal includes a multiple of leaf springs directed toward the circumferential slot.

A further embodiment of any of the foregoing embodiments of the present disclosure includes, wherein the ring seal engages an axial face of the multiple of air seal segments.

A gas turbine engine according to another disclosed non-limiting embodiment of the present disclosure includes an engine case static structure with a circumferential slot. A full-hoop thermal control ring is mounted to the engine case static structure. A multiple of air seal segments movably mounted to the full-hoop thermal control ring and a ring seal located within the circumferential slot, the ring seal engageable with an axial face of each of the multiple of air seal segments.

A further embodiment of any of the foregoing embodiments of the present disclosure includes, wherein the ring seal includes a multiple of fingers directed toward the circumferential slot.

A further embodiment of any of the foregoing embodiments of the present disclosure includes, wherein the ring seal includes a multiple of leaf springs directed toward the circumferential slot.

A method of active blade tip clearance control for a gas turbine engine, according to another disclosed non-limiting embodiment of the present disclosure includes axially sealing a multiple of air seal segments permitting the multiple of air seal segments to move axially forward and aft due to thermal growth, and radially in and out with respect to a central longitudinal engine axis.

A further embodiment of any of the foregoing embodiments of the present disclosure includes locating a ring seal with a multiple of fingers between the multiple of air seals and an engine case static structure with a circumferential slot, the multiple of fingers directed toward the circumferential slot.

A further embodiment of any of the foregoing embodiments of the present disclosure includes locating a ring seal with a multiple of leaf springs between the multiple of air seals and an engine case static structure with a circumferential slot, the multiple of leaf springs directed toward the circumferential slot.

A further embodiment of any of the foregoing embodiments of the present disclosure includes locating a ring seal between the multiple of air seals and an engine case static structure with a circumferential slot, the ring seal at least partially within the circumferential slot.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
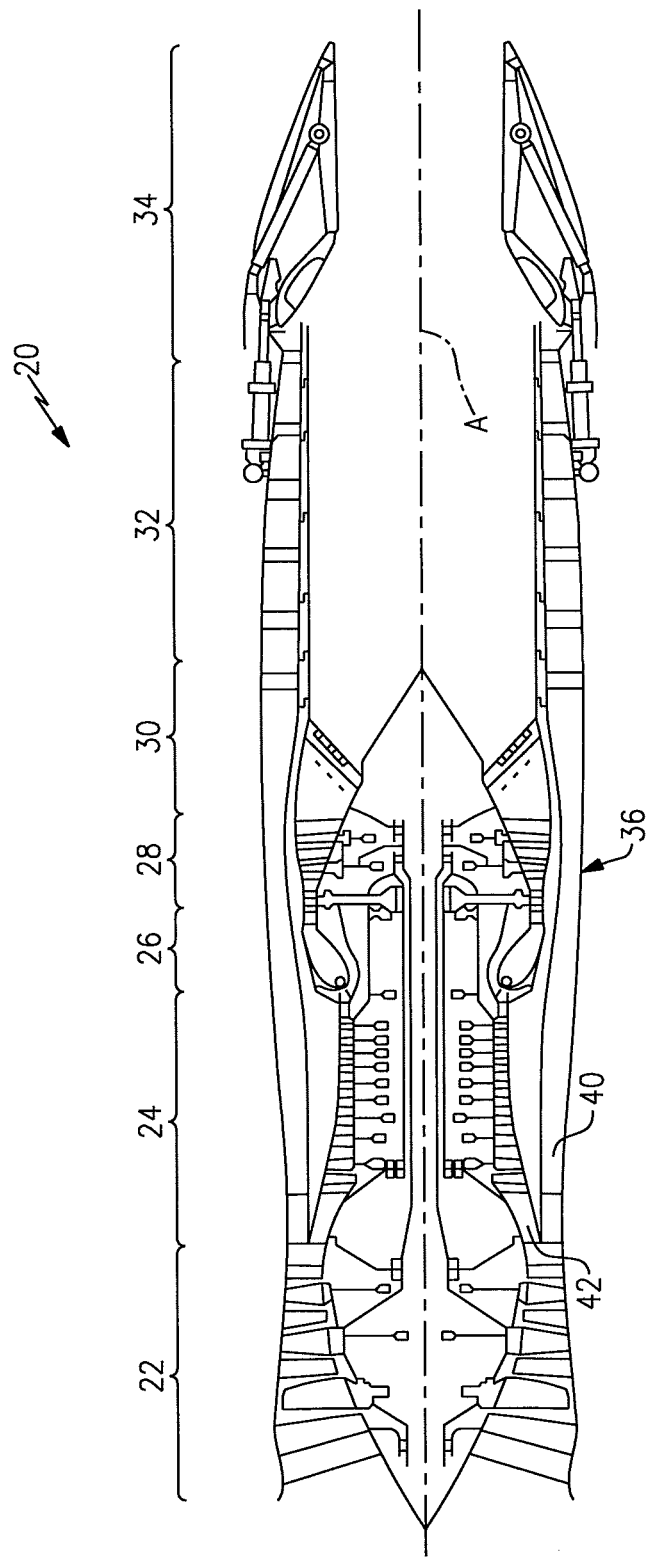
FIG. 1 is a schematic cross-section of one example aero gas turbine engine.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter section 30, an exhaust duct section 32, and a nozzle system 34 along a central longitudinal engine axis A. Although depicted as an augmented low bypass turbofan in the disclosed non-limiting embodiment, it should be understood that the concepts described herein are applicable to other gas turbine engines including non-augmented engines, geared architecture engines, direct drive turbofans, turbojet, turboshaft, multi-stream variable cycle adaptive engines and other engine architectures. Variable cycle gas turbine engines power aircraft over a range of operating conditions and essentially alters a bypass ratio during flight to achieve countervailing objectives such as high specific thrust for high-energy maneuvers yet optimizes fuel efficiency for cruise and loiter operational modes.

An engine case static structure 36 defines a generally annular secondary airflow path 40 around a core airflow path 42. Various case static structures and modules may define the engine case static structure 36 which essentially defines an exoskeleton to support the rotational hardware.

Air that enters the fan section 22 is divided between a core airflow through the core airflow path 42 and a secondary airflow through a secondary airflow path 40. The core airflow passes through the combustor section 26, the turbine section 28, then the augmentor section 30 where fuel may be selectively injected and burned to generate additional thrust through the nozzle system 34. It should be appreciated that additional airflow streams such as third stream airflow typical of variable cycle engine architectures may additionally be sourced from the fan section 22.

The secondary airflow may be utilized for a multiple of purposes to include, for example, cooling and pressurization. The secondary airflow as defined herein may be any airflow different from the core airflow. The secondary airflow may ultimately be at least partially injected into the core airflow path 42 adjacent to the exhaust duct section 32 and the nozzle system 34.

The exhaust duct section 32 may be circular in cross-section as typical of an axisymmetric augmented low bypass turbofan or may be non-axisymmetric in cross-section to include, but not be limited to, a serpentine shape to block direct view to the turbine section 28. In addition to the various cross-sections and the various longitudinal shapes, the exhaust duct section 32 may terminate in a Convergent/Divergent (C/D) nozzle system, a non-axisymmetric two-dimensional (2D) C/D vectorable nozzle system, a flattened slot nozzle of high aspect ratio or other nozzle arrangement.

Figure 2:
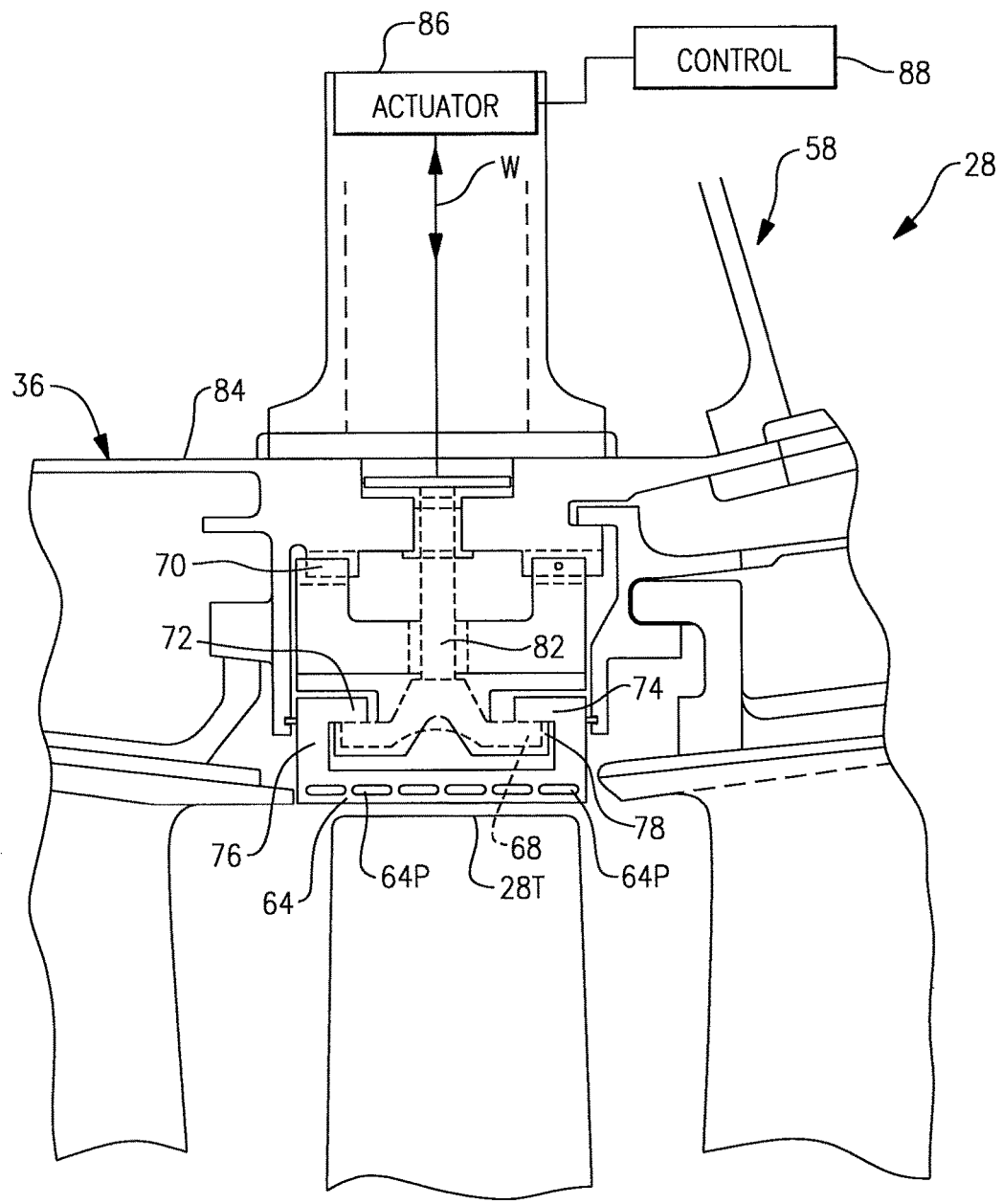
FIG. 2 is an is an enlarged partial sectional schematic view of a portion of a rapid response active clearance control system in rotor stage between a forward and aft vane array.

With reference to FIG. 2, a blade tip rapid response active clearance control (RRACC) system 58 includes a radially adjustable blade outer air seal system 60 outboard of a blade array 50 between a forward vane array 52 and an aft vane array 54. The radially adjustable blade outer air seal system 60 operates to control blade tip clearances for the blade array 50 inside for example, the turbine section 28, however, other sections such as the compressor section 24 will also benefit herefrom. The radially adjustable blade outer air seal system 60 may be arranged around each or particular stages within the gas turbine engine 20. That is, each rotor stage may have an associated radially adjustable blade outer air seal system 60 of the blade tip rapid response active clearance control system 58.

Figure 3:
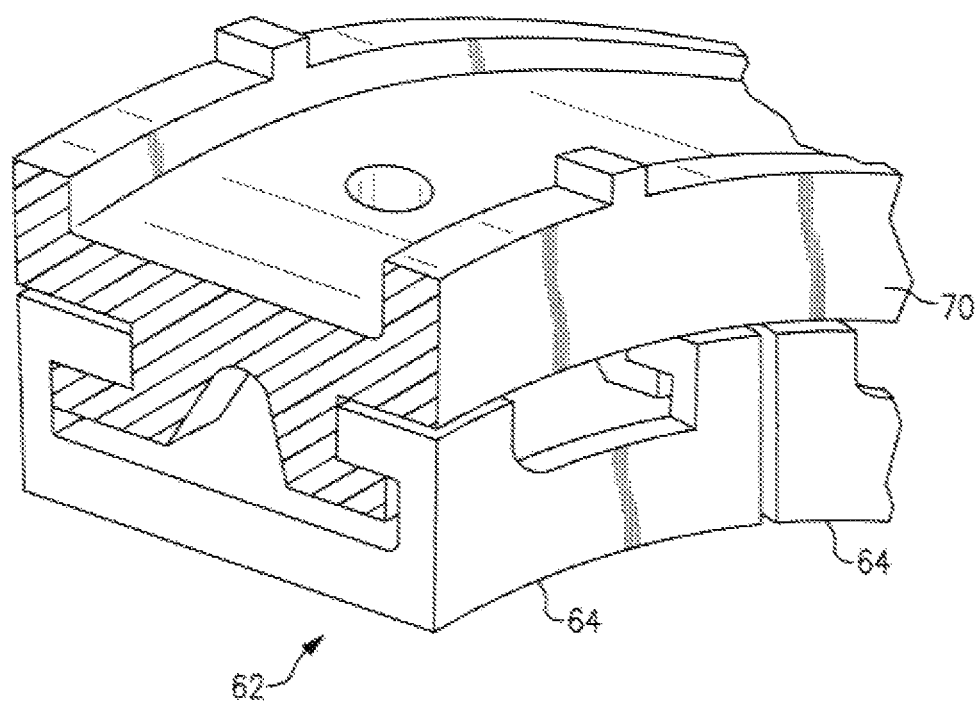
FIG. 3 is a partial perspective view of a portion of a rapid response active clearance control system rotor stage.

Each radially adjustable blade outer air seal system 60 is subdivided into a multiple of circumferential segments 62, each with a respective air seal segment 64, a drive link 66 and a puller 68 (also shown in FIG. 3). In one disclosed non-limiting embodiment, each circumferential segment 62 may extend circumferentially for about nine (9) degrees (FIG. 3). It should be appreciated that any number of circumferential segments 62 may be and various other components may alternatively or additionally be provided.

Each of the multiple of air seal segments 64 is at least partially supported by a generally fixed full-hoop thermal control ring 70. That is, the full-hoop thermal control ring 70 is mounted to, or forms a portion of, the engine case static structure 36. It should be appreciated that various static structures may additionally or alternatively be provided to at least partially support the multiple of air seal segments 64 yet permits relative radial movement therebetween.

Each air seal segment 64 may be manufactured of an abradable material to accommodate potential interaction with the rotating blade tips 28T within the turbine section 28. Each air seal segment 64 also includes numerous cooling air passages 64P to permit secondary airflow therethrough.

A radially extending forward hook 72 and an aft hook 74 of each air seal segment 64 respectively cooperates with a forward hook 76 and an aft hook 78 of the full-hoop thermal control ring 70. The forward hook 76 and the aft hook 78 of the full-hoop thermal control ring 70 may be segmented or otherwise configured for assembly of the respective air seal segment 64 thereto. The forward hook 72 may extend axially aft and the aft hook 74 may extend axially forward (shown); vice-versa or both may extend axially forward or aft within the engine to engage the reciprocally directed forward hook 76 and aft hook 78 of the full-hoop thermal control ring 70.

Each drive link 66 may extend through an engine case 84 to an actuator 86 (illustrated schematically) that operates in response to a control 88 (illustrated schematically). The actuator 86 may include a mechanical, electrical and/or pneumatic drive 82 that operates to move each air seal segment 64 so as to contract and expand the radially adjustable blade outer air seal system 60. It should be appreciated that various other control components such as sensors, actuators and other subsystems may be utilized herewith.

The control 88 generally includes a control module that executes radial tip clearance control logic to thereby control the radial tip clearance relative the rotating blade tips. The control module typically includes a processor, a memory, and an interface. The processor may be any type of known microprocessor having desired performance characteristics. The memory may be any computer readable medium which stores data and control algorithms such as logic as described herein. The interface facilitates communication with other components such as a thermocouple, and the actuator 86. In one non-limiting embodiment, the control module may be a portion of a flight control computer, a portion of a Full Authority Digital Engine Control (FADEC), a stand-alone unit or other system.

In operation, the blade tip rapid response active clearance control system 58 may utilize, for example, an actuator 86 that provides about 1200-1400 pounds (1600-1898 newton meters) of force to provide a radial displacement capability for the array of air seal segments 64 of about 0.040" (40 thousandths; 1 mm) in one disclosed non-limiting embodiment. The radial displacement may, at least partially, be a function of the engine core size and the dynamic conditions of the particular engine architecture.

Figure 4:
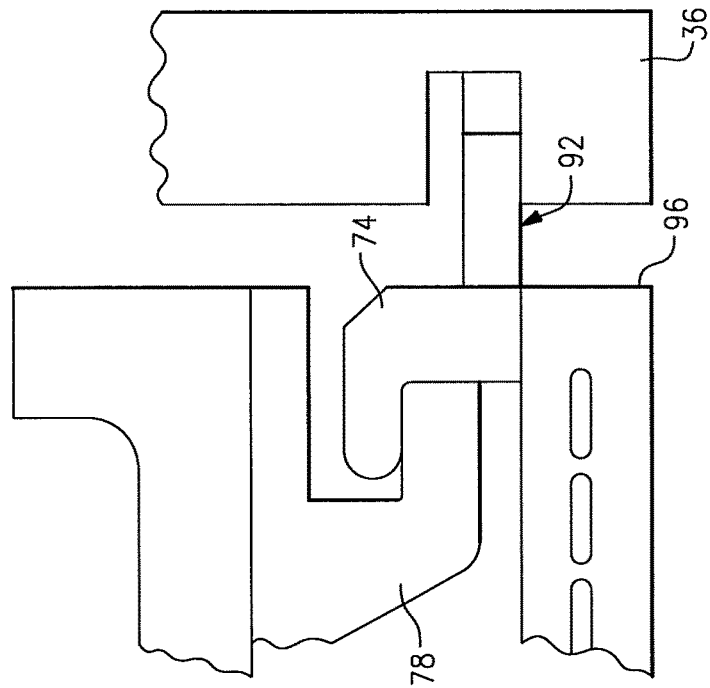
FIG. 4 is an enlarged sectional schematic view of one of a multiple of air seal segments with a ring seal.
Figure 4:
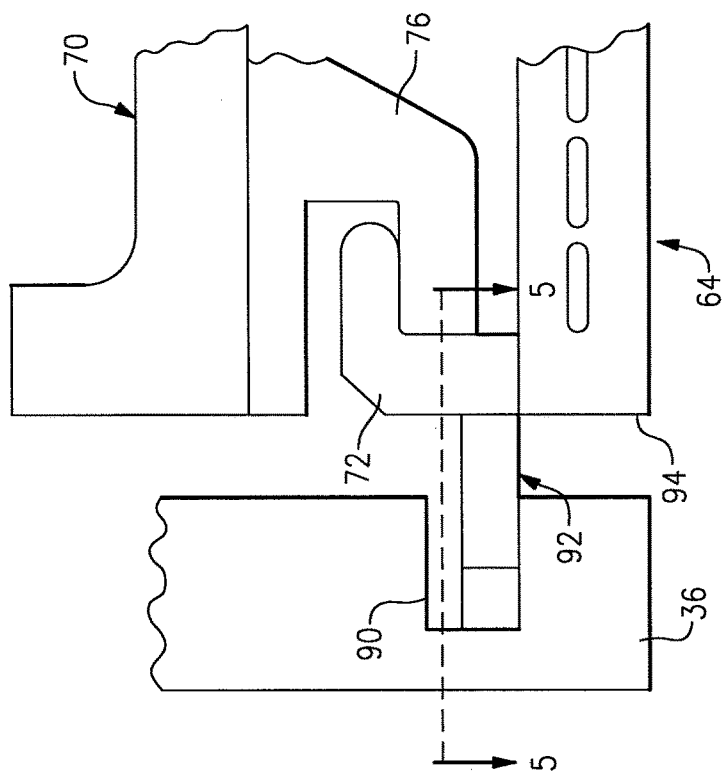

With reference to FIG. 4, the engine case static structure 36 includes a circumferential slot 90 which at least partially supports a respective ring seal 92 that seals to an axially forward surface 94 of the multiple of air seal segments 64. Another circumferential slot 90 which at least partially supports another respective ring seal 92 may be located in an axially aft surface 96. It should be appreciated that numerous seals may be provided to form various radial annular compartments between the multiple of air seal segments 64 and the engine case static structure 36. It should also be appreciated that the engine case static structure 36 as schematically illustrated may include, cases, shrouds, vane arrays and other static structure within the engine 20.

Figure 5:
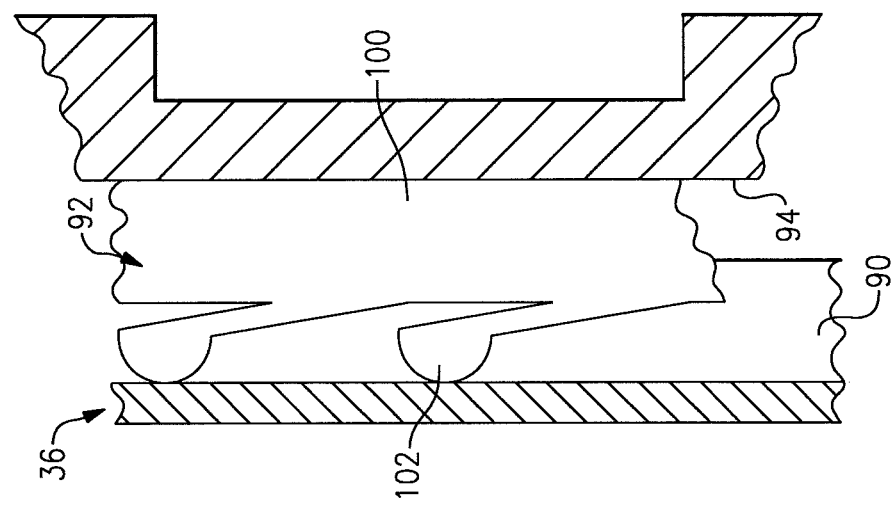
FIG. 5 is an enlarged top schematic view of a ring seal according to one disclosed non-limiting embodiment.

With reference to FIG. 5, the ring seal 92 in one disclosed non-limiting embodiment includes a base 100 with a multiple of fingers 102 that operate as springs to maintain an axial load between the multiple of air seal segments 64 and the engine case static structure 36. The multiple of fingers 102 are directed into the circumferential slot 90. This permits the multiple of air seal segments 64 to move axially forward and aft due to thermal growth, and radially in and out in response to the radially adjustable blade outer air seal system 60.

Figure 6:
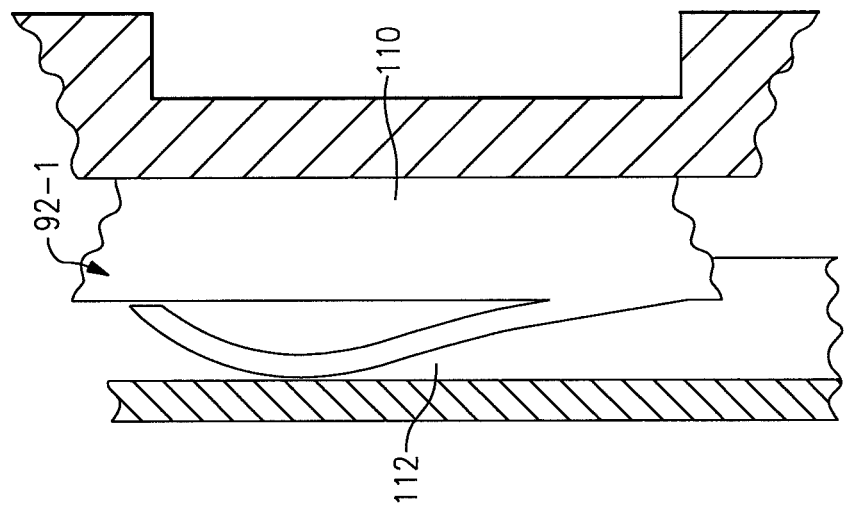
FIG. 6 is an enlarged top schematic view of a ring seal according to another disclosed non-limiting embodiment.

With reference to FIG. 6, a ring seal 92-1 in another disclosed non-limiting embodiment includes a base 110 with a multiple of leaf springs 112 that operate to maintain an axial load between the multiple of air seal segments 64 and the engine case static structure 36 as discussed above. It should be appreciated that various other ring seals and combination thereof will also benefit herefrom.

The ring seal 92, 92-1 permits both axial and radial movement, and is relatively small in comparison to typical "W" or "Dog-Bone" seals as such seals are limited in terms of package space.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. An active clearance control system for a gas turbine engine comprising:
   a full-hoop thermal control ring, wherein an aperture extends radially through the full-hoop thermal control ring;
   a multiple of air seal segments movably mounted to said full-hoop thermal control ring;
   a ring seal engageable with said multiple of air seal segments; and
   a plurality of linkages, each of said plurality of linkages connected to a respective one of said multiple of air seal segments, each of said plurality of linkages configured to move back and forth along a respective radially extending centerline to thereby radially move said respective one of said multiple of air seal segments.

2. The system as recited in claim 1, wherein said ring seal includes a multiple of fingers.

3. The system as recited in claim 1, wherein said ring seal includes a multiple of leaf springs.

4. The system as recited in claim 1, further comprising an engine case static structure with a circumferential slot, said ring seal located within said circumferential slot.

5. The system as recited in claim 4, wherein said ring seal is engageable with an axial face of each of said multiple of air seal segments.

6. The system as recited in claim 4, wherein said ring seal includes a multiple of fingers directed toward said circumferential slot.

7. The system as recited in claim 6, wherein said ring seal is engageable with an axial face of each said multiple of air seal segments.

8. The system as recited in claim 4, wherein said ring seal includes a multiple of leaf springs directed toward said circumferential slot.

9. The system as recited in claim 8, wherein said ring seal is engageable with an axial face of each said multiple of air seal segments.

10. A gas turbine engine comprising:
    an engine case static structure with a circumferential slot;
    a full-hoop thermal control ring mounted to said engine case static structure, wherein the full-hoop thermal control ring is configured with an aperture extending radially through the full-hoop thermal control ring;
    a multiple of air seal segments movably mounted to said full-hoop thermal control ring, a first of said multiple of air seal segments operable to move radially relative to said full-hoop thermal control ring; and a ring seal located within said circumferential slot, said ring seal engageable with an axial face of each of said multiple of air seal segments.

11. The gas turbine engine as recited in claim 10, wherein said ring seal includes a multiple of fingers directed toward said circumferential slot.

12. The gas turbine engine as recited in claim 10, wherein said ring seal includes a multiple of leaf springs directed toward said circumferential slot.

* * * * *